(12) United States Patent
Schelling

(10) Patent No.: US 7,424,604 B2
(45) Date of Patent: *Sep. 9, 2008

(54) WEIGHTED PROCESSOR SELECTION APPARATUS AND METHOD FOR USE IN MULTIPROCESSOR SYSTEMS

(75) Inventor: Todd A. Schelling, Irmo, SC (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/402,704

(22) Filed: Apr. 12, 2006

(65) Prior Publication Data

US 2006/0190713 A1 Aug. 24, 2006

Related U.S. Application Data

(63) Continuation of application No. 10/171,164, filed on Jun. 13, 2002, now Pat. No. 7,065,641.

(51) Int. Cl.
*G06F 15/177* (2006.01)
*G06F 9/00* (2006.01)
*G06F 9/24* (2006.01)
*G06F 11/00* (2006.01)

(52) U.S. Cl. .......................... 713/2; 713/1; 713/100; 714/1; 714/13

(58) Field of Classification Search .................. 713/1, 713/2, 100; 714/1, 13
See application file for complete search history.

(56) References Cited

U.S. PATENT DOCUMENTS

| | | | |
|---|---|---|---|
| 4,954,945 A | 9/1990 | Inoue | |
| 5,450,576 A | 9/1995 | Kennedy | |
| 5,623,589 A | 4/1997 | Needham et al. | |
| 5,642,506 A | 6/1997 | Lee | |
| 5,724,527 A | 3/1998 | Karnik et al. | |
| 5,764,882 A | 6/1998 | Shingo | |
| 5,768,585 A | 6/1998 | Tetrick et al. | |
| 5,778,408 A | 7/1998 | Valentine | |
| 5,790,850 A | 8/1998 | Natu | |
| 5,867,702 A | 2/1999 | Lee | |
| 5,889,977 A | 3/1999 | Schultz | |

(Continued)

FOREIGN PATENT DOCUMENTS

JP          405120048 A     5/1993

OTHER PUBLICATIONS

Merriam-Webster's Collegiate Dictionary, Tenth Edition. 1997 Merriam-Webster, Incorporated, p. 1340.

(Continued)

*Primary Examiner*—Nitin C Patel
*Assistant Examiner*—Mohammed Rehman
(74) *Attorney, Agent, or Firm*—Blakely, Sokoloff, Taylor & Zafman LLP

(57) ABSTRACT

A processor programmed to write to a memory location a first weighted value corresponding to the processor to overwrite a second weighted value stored in the memory location and associated with another processor. The processor is also programmed to compare the first weighted value of the processor with the second weighted value associated with the other processor and to select the processor if the first weighted value of the processor is better than the second weighted value.

26 Claims, 5 Drawing Sheets

U.S. PATENT DOCUMENTS

| | | | |
|---|---|---|---|
| 6,009,521 | A | 12/1999 | Huang |
| 6,058,475 | A | 5/2000 | McDonald et al. |
| 6,108,781 | A | 8/2000 | Jayakumar |
| 6,470,435 | B2 | 10/2002 | Samra et al. |
| 6,584,560 | B1 | 6/2003 | Kroun et al. |
| 6,594,756 | B1 | 7/2003 | Datta et al. |
| 6,601,165 | B2 * | 7/2003 | Morrison et al. ............... 713/2 |
| 6,611,911 | B1 | 8/2003 | O'Shea et al. |
| 6,665,761 | B1 | 12/2003 | Svenkeson et al. |
| 6,687,818 | B1 * | 2/2004 | Svenkeson et al. ............. 713/2 |
| 6,925,556 | B2 * | 8/2005 | Hill et al. ....................... 713/2 |
| 7,000,101 | B2 * | 2/2006 | Wu et al. ........................ 713/1 |

OTHER PUBLICATIONS

International Preliminary Examination Report corresponding to International Application No. PCT/US03/18836, Aug. 26, 2004, 5 sheets.

Written Opinion corresponding to International Application No. PCT/US03/18836, Apr. 6, 2004, 5 sheets.

International Search Report corresponding to International Application No. PCT/US03/18836, Apr. 6, 2004, 4 sheets.

First Office Action from Foreign Counterpart China Patent Application No. 03813629.5, mailed Sep. 8, 2006, 7 pgs. (translation included-action in Chinese not sent by foreign associate).

Notice of Preliminary Rejection from Foreign Counterpart Korean Patent Application No. 10-2004-7020069, mailed May 25. 2006, 5 pgs. (translation included).

Notice of Preliminary Rejection from Foreign Counterpart Korean Patent Application No. 10-2004-7020069, mailed Aug. 23, 2007, 5 pgs. (translation included).

Notice of Final Rejection from Foreign Counterpart Korean Patent Application No. 10-2004-7020069, mailed Jan. 30, 2008, 6 pgs. (translation included).

Notification of Transmittal of the International Search Report or the Declaration Foreign Counterpart PCT/US03/18836, mailed Dec. 15, 2003, 4 pgs.

Office Action from U.S. Appl. No. 10/171,164, mailed Dec. 18, 2004, 17 pgs.

Office Action from U.S. Appl. No. 10/171,164, mailed Dec. 28, 2005, 8 pgs.

Office Action from U.S. Appl. No. 10/171,164, mailed Dec. 29, 2003, 14 pgs.

Office Action from U.S. Appl. No. 10/171,164, mailed Apr. 12, 2006, 9 pgs.

Office Action from U.S. Appl. No. 10/171,164, mailed May 18, 2005, 16 pgs.

Office Action from U.S. Appl. No. 10/171,164, mailed Jun. 8, 2004, 23 pgs.

Office Action from U.S. Appl. No. 10/171,164, mailed Aug. 4, 2005, 3 pgs.

Second Office Action from Foreign Counterpart China Patent Application No. 031813629.5 mailed Jun. 13, 2008, pp. 3.

Notice of Preliminary Rejection from Foreign Counterpart Divisional Korean Patent Application No. 10-2008-7005302 mailed Jul. 1, 2008, pp. 5 (translation included).

* cited by examiner

WEIGHTED PROCESSOR SELECTION APPARATUS AND METHOD FOR USE IN MULTIPROCESSOR SYSTEMS

The issued patent is a continuation of U.S. patent application Ser. No. 10/171,164, filed on Jun. 13, 2002 now U.S. Pat. No. 7,065,641.

FIELD OF THE INVENTION

The present invention relates generally to multiprocessor systems and, more particularly, to a weighted processor selection apparatus and method for use in multiprocessor systems.

DESCRIPTION OF THE RELATED ART

Early firmware execution (e.g., a start up or boot process) within multiprocessor systems is particularly problematic. During the early stages of firmware execution within a multiprocessor system, such as, for example, following a system reset, many of the functions performed during the start-up or boot process are not multiprocessor safe. In particular, during the early stages of firmware execution, system memory and cache are not fully developed and, thus, memory coherency mechanisms are not operational and memory coherency cannot be maintained. As a result, early firmware execution within a multiprocessor system can result in two or more processors simultaneously attempting to access a resource. For example, two or more processors may simultaneously attempt to write to a register, which may result in the storage of incorrect or stale data in the memory resource.

One common approach to minimizing the difficulties associated with the early stages of firmware execution within multiprocessor systems is to select a single processor to function as the boot strap processor (BSP). As is well known, selection of a single BSP enables the BSP to perform functions that prepare the multiprocessor system for full operation (e.g., execution of an operating system), including establishing memory coherency schemes, while the other processors within the multiprocessor system remain idle. In this manner, the selection of a single processor (e.g., a BSP) enables a multiprocessor system to advance through early firmware stages, in which memory coherency has not been established, using only a single processor and eliminates the possibility of writing stale data to a resource that would otherwise be shared by the processors within the multiprocessor system.

Within some multiprocessor systems such as, for example, Intel Corporation IA-32 based systems, selection of a BSP is automatically performed using a front-side bus (FSB) protocol. With the FSB protocol, each processor within a multiprocessor system includes a plurality of signal inputs or pins that are connected or strapped to a system bus to establish a unique binary code or identifier for each processor based on the physical location of the processor on the FSB. Each of the processors samples its pins upon system reset and reads and internally stores its unique identifier.

With the FSB protocol, one of the processors having a particular predetermined identifier is designated as the BSP upon system reset. Typically, the designated BSP generates a system management interrupt via inter-processor interrupts (IPIs). In particular, the BSP uses the unique identifiers for the other processors to direct IPIs at these processors to force them into a known idle state. With the other processors in an idle state, the BSP has complete control over the boot process until system memory and cache have been fully developed to enable multiprocessor safe operation.

Some microprocessor architectures such as, for example, the architecture employed by the Intel Itanium™ family of processors, do not provide for automatic selection of a BSP using a hardware technique such as the above-mentioned FSB protocol. Instead, processors that do not provide a hardware-based mechanism for selection of a BSP typically rely on multiprocessor safe firmware to select a BSP.

During operating system execution, multiprocessor systems commonly employ atomic (i.e., un-interruptible) read/compare/write instructions such as, for example, cmpxchg, to create a memory-based semaphore that enables the selection of a single processor from a plurality of processors within a multiprocessor system. Unfortunately, while such firmware-based processor selection techniques may be employed during later firmware execution stages, those techniques cannot be used during early firmware execution stages when coherent memory is unavailable.

In another approach that facilitates selection of a single processor (e.g., a BSP) within a multiprocessor system, the chipset used with the system includes a special register that returns a particular value when first read and a different value for all subsequent reads. In this manner, the first processor to read the special register will recognize, based on the value retrieved from the register, that it is the BSP and the remaining processors that subsequently read the register and retrieve the different value will recognize that they are to remain idle. While this special register provides a mechanism for selecting a single processor from a plurality of processors, the selection is arbitrary and, thus, does not consider the health or operating condition of the available processors within the multiprocessor system.

DESCRIPTION

Figure 1:
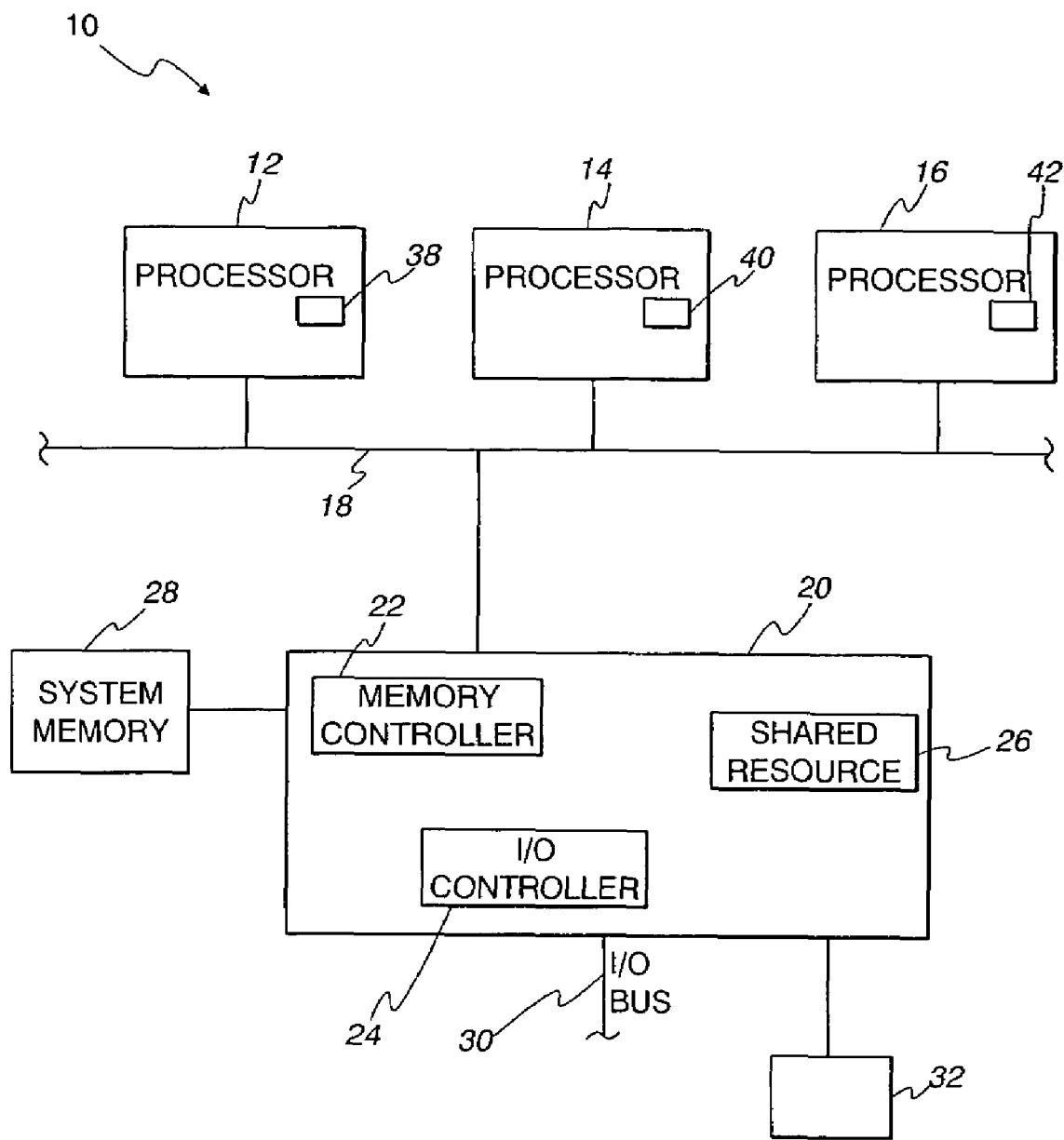
FIG. 1 is a block diagram of an example of a multiprocessor system that uses the processor selection technique described herein.

FIG. 1 is a block diagram of an example of a multiprocessor system 10 that uses the example processor selection technique described herein. As shown in FIG. 1, the multiprocessor system 10 includes a plurality of processors 12, 14 and 16 that are coupled to each other via an interconnection bus or network 18. The processors 12-16 may be any suitable processor, processing unit or microprocessor such as, for example, Intel Itanium™ processors, Intel X-Scale™ processors, Intel Pentium™ processors, etc.

The processors 12-16 are also coupled to a chipset 20, which includes a memory controller 22, an input/output (I/O) controller 24 and a shared resource 26. As is well known, a chipset typically provides I/O and memory management functions as well as a plurality of general purpose and/or special purpose registers, timers, etc. that are accessible or used by one or more processors coupled to the chipset. The memory controller 22 performs functions that enable the processors 12-16 to access a system memory 28, which may include any desired type of volatile memory such as, for example, static random access memory (SRAM), dynamic random access memory (DRAM), etc. The I/O controller 24 performs functions that enable the processors 12-16 to communicate with peripheral devices (not shown) via an I/O bus 30. While the memory controller 22 and the I/O controller 24 are depicted in FIG. 1 as separate functional blocks within the chipset 20, the functions performed by these blocks may be integrated within a single semiconductor circuit or may be implemented using two or more separate integrated circuits.

In the example shown in FIG. 1, the shared resource 26 is a register within the chipset 20 that is accessible by all of the processors 12-16. Although the shared resource 26 is depicted in FIG. 1 as separate from the memory controller 22 and the I/O controller 24, the shared resource 26 may instead be a register within the memory controller 22 or the I/O controller 24. The register used for the shared resource 26 is a readable and writeable register that has a known default value such as, for example, the value zero, following reset of the system 10.

In the case where the processors 12-16 are Intel Itanium™ processors, an Intel 870 chipset may be used for the chipset 20. The Intel 870 chipset provides a plurality of scratchpad registers, any of which are capable of performing the functions of the shared resource 26 as described in greater detail herein. However, it should be recognized that while scratchpad registers, such as those provided by the 870 chipset, are well-suited for use as the shared resource 26, any other register with acceptable side-effects could be used instead. In other words, any register that could be used in conjunction with the technique described in connection with FIGS. 2a-2c below without adversely affecting the operation of the system 10 is a suitable alternative. Thus, any register could be used as the shared resource 26 if access to that register (i.e., reading from and/or writing to that register) by the processors 12-16 would not cause an undesirable consequence or side-effect. For example, the base address register associated with a fixed peripheral component interconnect (PCI) device that is not otherwise being used by the system 10 while carrying out the processor selection technique described herein could be used as the shared resource 26.

As is also depicted in FIG. 1, the processors 12-16 include respective interval timer/counter (ITC) registers 38-42 that count at a known frequency. For example, in the case where the processors 12-16 are Intel Itanium™ processors, the ITC registers 38-42 are sixty-four bit registers that can be reset and then continuously count up from zero at a rate of 1 billion counts per second. Due to the large size of the ITC registers (i.e., the number of counter bits) within Intel Itanium™ processors, these ITC registers can count continuously, without rollover, for more than 580 years.

In addition, the system 10 includes a non-volatile memory 32 that stores computer code (e.g., software or firmware) for carrying out the processor selection technique described herein. As shown in FIG. 1, the non-volatile memory 32 may be coupled to the chipset 20 and, thus, may be accessed by the processors 12-16 via the chipset 20. Additionally or alternatively, the non-volatile memory 32 may be located within the chipset 20 and/or may be coupled to the processors 12-16 via the I/O bus 30. In a case where the non-volatile memory 32 is distributed (e.g., a part of the memory 32 is coupled via the I/O bus 30 and another part of the memory is coupled to the chipset 20 as shown in FIG. 1), the computer code for carrying out the processor selection technique described herein can be distributed among these different parts of the memory 32.

The example processor selection technique shown in FIGS. 2a-2c below, is a software or firmware-based technique that enables a multiprocessor system, such as the system 10 shown in FIG. 1, to select one processor (e.g., the processor 14) or, if desired, a group of processors (e.g., the processors 12 and 14) from a plurality of processors (e.g., the processors 12-16) based on a comparison of weighted values associated with the processors. More specifically, each of the weighted values corresponds to one of the processors 12-16 and is indicative of an attribute or attributes of that corresponding processor. For example, the weighted values may be indicative of the relative health, condition or performance of the processors within a multiprocessor system. In particular, one or more of processor execution speed, processor case temperature, built-in self test results, status of the processor abstraction layer (PAL) handoff, local flash memory status, etc. can be used to generate a weighted value for each of the processors 12-16. In addition, the weighted values can also incorporate information that is not related to the health, condition or performance of the processors 12-16 such as, for example, numerical identifiers, each of which is uniquely associated with one of the processors 12-16.

Figure 2A:
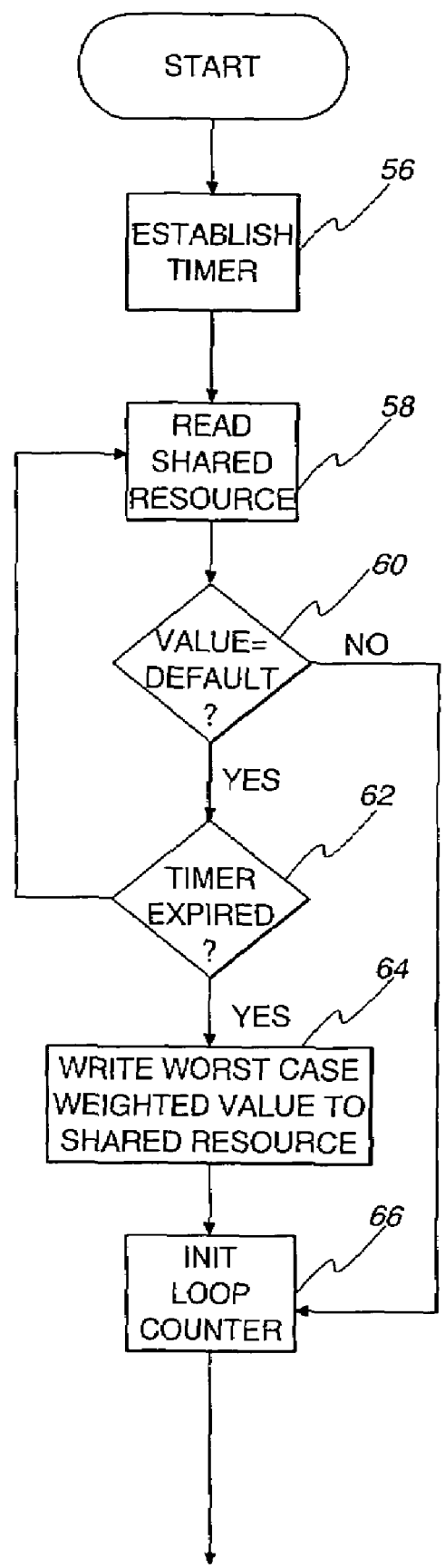
FIGS. 2a-c are a flow diagram that depicts an example of one manner in which the processor selection technique described herein can be used within the multiprocessor system shown in FIG. 1.
Figure 2B:
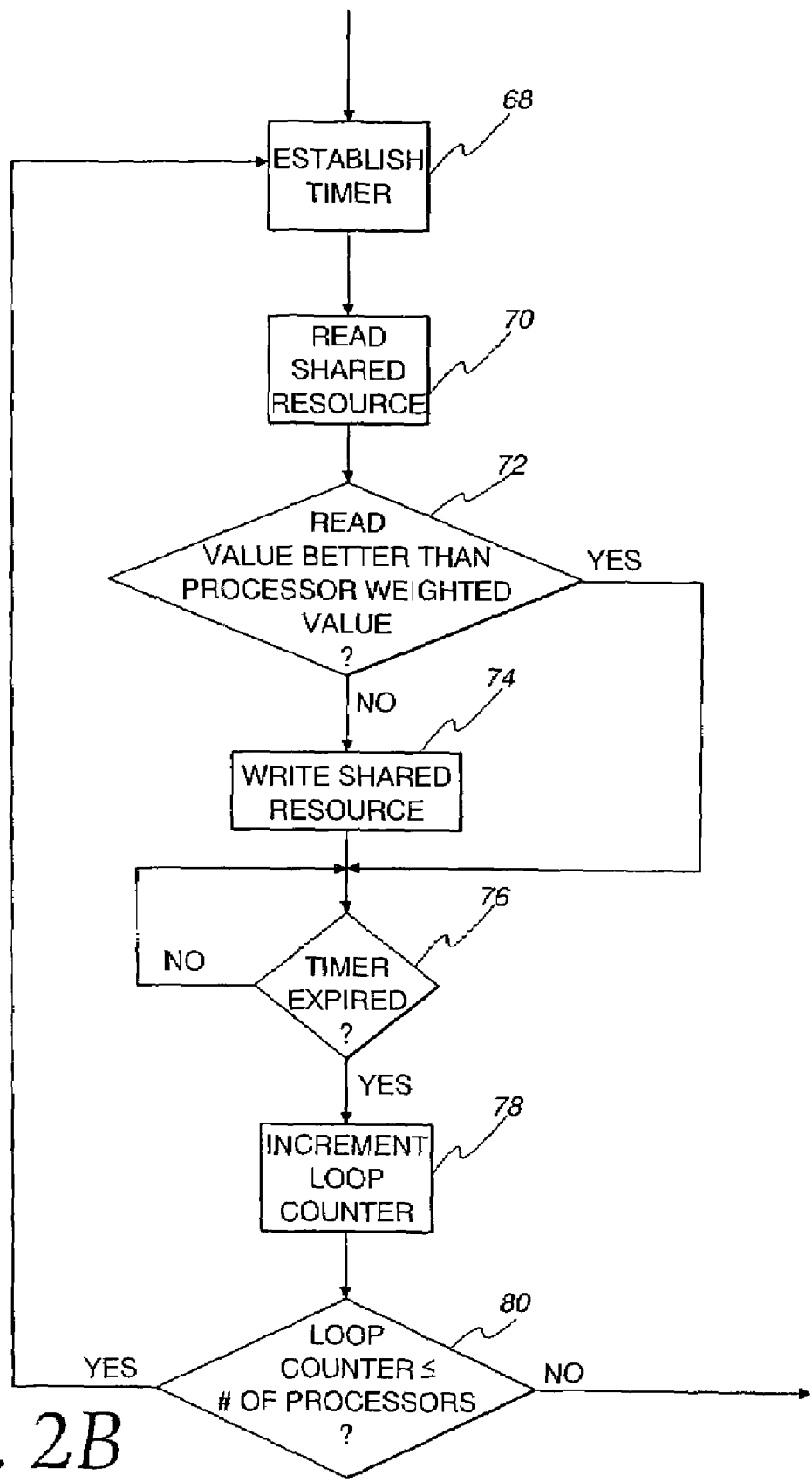
Figure 2C:
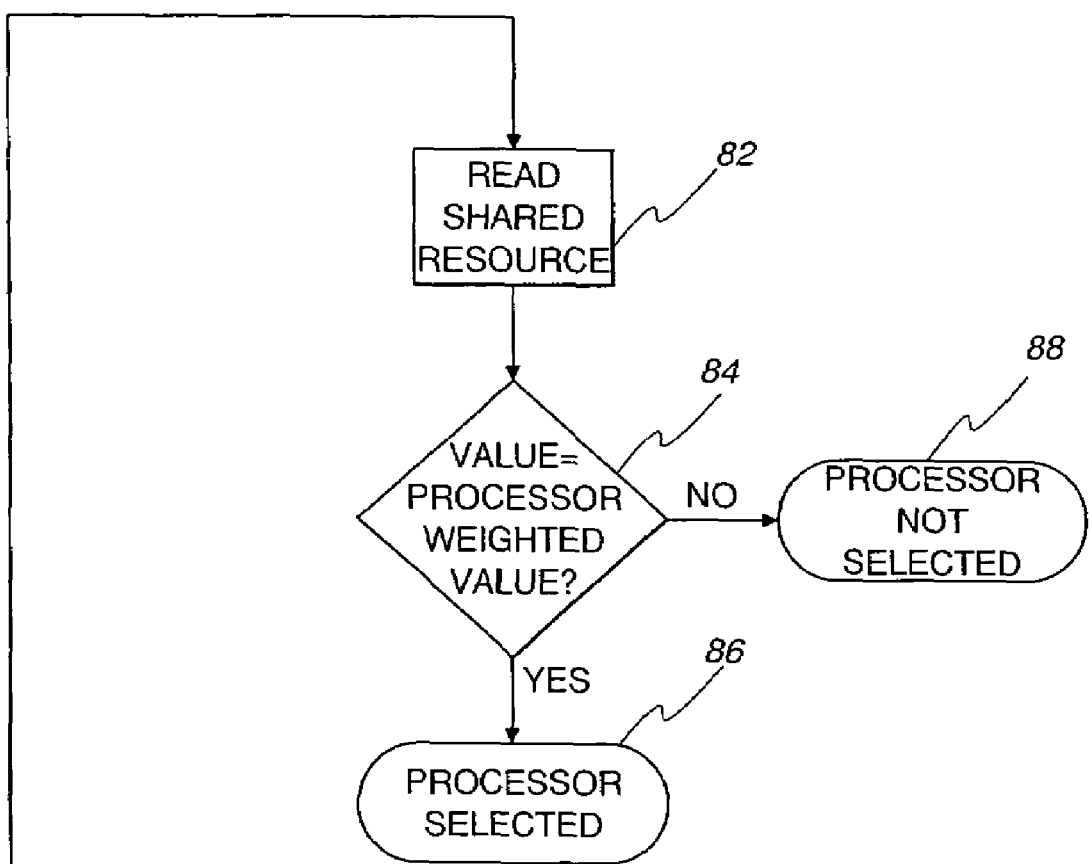
Figure 2:
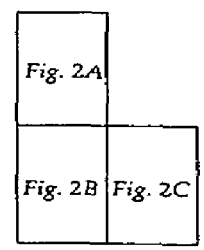

The processor selection technique shown in FIGS. 2a-c does not require the use of multiprocessor safe resources and, thus, is particularly useful for selecting a single processor (e.g., the processor 12) to carry out functions that are not multiprocessor safe during early stages of firmware execution (i.e., before coherent memory and cache are available). For example, the processor selection technique shown in FIGS. 2a-c can be advantageously applied within a multiprocessor system to select a boot strap processor (BSP), particularly in multiprocessor systems that employ processors which do not provide a hardware-based mechanism for BSP selection and, thus, rely on software or firmware to carry out selection of a BSP.

Of course, the processor selection technique shown in FIGS. 2a-c may also be used to select a single processor to carry out functions that are not multiprocessor safe during later firmware execution stages such as, for example, during operating system execution. For example, processor operations that require access to complementary metal oxide semiconductor (CMOS) random access memory (RAM) are not multiprocessor safe. Thus, the processor selection technique shown in FIGS. 2a-c can be used to select a single processor from a plurality of processors to carry out an operation requiring access to CMOS RAM. However, in practice, atomic instructions or memory-based semaphores are typically used to guarantee that only one processor within a multiprocessor system accesses a CMOS RAM at a given time.

The processor selection technique shown in FIGS. 2a-c includes three distinct phases or routines. During a first phase or routine shown in FIG. 2a, the operations of the plurality of processors 12-16 within the multiprocessor system 10 are substantially synchronized by collecting and trapping the processors 12-16 in respective wait loops (blocks 58-62) and then releasing the processors 12-16 from their respective wait loops at substantially the same time. Because the processors within a multiprocessor system typically execute instructions at somewhat different rates, the times at which each processor within a multiprocessor system begins executing the selection technique shown in FIGS. 2a-c may vary. Thus, to guarantee that all of the processors 12-16 within the multiprocessor system 10 will be trapped in their wait loops and, thus, substantially synchronized before being released, the first phase or routine delays the first one of the processors 12-16 to begin execution of the first phase or routine (FIG. 2a) in its wait loop at least until all of the remaining processors within the multiprocessor system 10 have begun execution of the first phase or routine (FIG. 2a) and entered their respective wait loops (blocks 58-62).

During a second phase or routine shown in FIG. 2b, the example processor selection technique (FIGS. 2a-c) provides all the processors 12-16 within the multiprocessor system 10 an opportunity to compare their respective weighted values to a value stored in the shared resource 26 and to write their weighted value to the shared resource 26 if their weighted value is better than the value currently stored in the shared resource 26. To ensure that the processor having the best weighted value has stored its weighted value in the shared resource 26 at the completion of the second phase or routine (FIG. 2b), all of the processors 12-16 execute the second phase or routine in a substantially synchronized manner (i.e., approximately simultaneously) once for each processor in the multiprocessor system 10. In other words, because there are three processors in the multiprocessor system 10, the three processors 12-16 execute the second phase or routine (FIG. 2b) in a substantially simultaneous manner three times. As a result, even if the shared resource 26 is not multiprocessor safe, the best weighted value is ultimately written to the shared resource 26. For example, if the processors 12-16 have three different weighted values and execute the second routine a first time, each of the processors 12-16 may simultaneously determine that their weighted value is better than the value currently stored in the shared resource 26 and, thus, all of the processors 12-16 will contend for the shared resource 26 by attempting to write their weighted value to the shared resource 26. Of course, because the shared resource 26 is not multiprocessor safe (i.e., is not maintained as coherent memory), the value ultimately written to the shared resource 26 can be the weighted value associated with any one of the processors 12-16 and is not necessarily the best weighted value among the processors 12-16 attempting to write to the shared resource 26. If the value written to the shared resource 26 is the third best (i.e., the worst value), then during the next or second execution of the second phase or routine (FIG. 2b), only two of the processors 12-16 will attempt to write their weighted values to the shared resource 26 because only two of the processors 12-16 will determine that their weighted value is better than the value currently stored in the shared resource 26. It can be readily appreciated from the foregoing that if each time the second phase or routine is performed, the processor having the worst weighted value wins the contention for the shared resource 26 among the processors 12-16, the second routine will have to be performed at least N times for a multiprocessor system having N processors to ensure that the processor having the best weighted value ultimately writes its weighted value to the shared resource.

During a third phase or routine shown in FIG. 2c, the processor selection technique enables each of the processors 12-16 within the multiprocessor system 10 to determine whether it has been selected for performing a particular task such as, for example, carrying out the activities of a BSP. In particular, each of the processors 12-16 compares its weighted value to the best weighted value stored in the shared resource 26 at the conclusion of the last iteration of the second phase or routine (FIG. 2b). If a processor determines that its weighted value is equal to the value stored in the shared resource 26, then that processor recognizes that is has been selected from the processors 12-16.

The processor selection technique described above is executed by each processor within a multiprocessor system in a substantially synchronized manner (i.e., approximately simultaneously). In the example described in greater detail in connection with FIGS. 2a-2c below, the technique is implemented using firmware stored within the non-volatile memory 32. In addition, it should be recognized that although the multiprocessor system 10 shown in FIG. 1 is depicted as having three processors, the technique described in connection with FIGS. 2a-2c below may instead be used with a multiprocessor system having two processors or more than three processors, if desired.

FIGS. 2a-2c, depict an example of one manner in which the multiprocessor system 10 shown in FIG. 1 can be configured to select one of the processors 12-16 to function as a BSP during early firmware execution or to perform some other function that is not multiprocessor safe. FIG. 2a depicts an example of a first phase or routine that substantially synchronizes the processors 12-16 within the multiprocessor system 10 by collecting and trapping the processors 12-16 in respective wait loops and then releasing the processors 12-16 from their wait loops at substantially the same time. More specifically, as each of the processors 12-16 begins executing the first phase or routine, they establish a timer (block 56) using their respective ITC registers 38-42 to measure a time that is greater than or equal to the worst case time difference between a first time at which a first one of the processors 12-16 begins executing the first phase or routine and a second later time at which the last one of the processors 12-16 begins executing the first phase or routine. In particular, because the processors 12-16 may execute instructions at a different rate, the processors 12-16 will establish their timers at different times. For example, in the case where the processor selection technique shown in FIGS. 2a-c is used to select a BSP for the system 10, the processors 12-16 may begin execution of the second phase or routine and, thus, establish their timers (block 56) at different times following a reset of the system 10.

As discussed in greater detail in connection with blocks 58-64 below, establishing a timer within each of the processors 12-16 equal to the worst case delay between the time at which the first processor begins execution of the first phase or routine and the time at which the last processor begins execution of the first phase or routine enables all of the processors 12-16 to be collected or caught in their respective wait loops (blocks 58-62) before being released substantially simultaneously when the processor having the first to expire timer executes the activities represented by block 64.

In the case where the processors 12-16 are Intel Itanium™ processors, the processors 12-16 preferably establish their timers using the ITC registers provided therein. In particular, the processors 12-16 may establish their timers by reading a current value of the ITC register (block 56) and then determining, based on the known clocking rate of the ITC register, a future count value of the ITC register that corresponds to a future time that is a worst case time delay later. Of course, the specific manner in which the processors 12-16 establish their timers will vary to suit the particular hardware platform or processor type used by the system 10.

After establishing their timers, each of the processors 12-16 reads the shared resource 26 (block 58) and returns a value represented by a digital word having a number of bits equal to the maximum number of bits used to represent the weighted values associated with the processors 12-16. Each of the processors 12-16 then determines whether value returned by the shared resource 26 is equal to a default value (block 60). As noted above, the shared resource 26 is preferably a register or the like within the chipset 20 that has a known default value such as, for example, zero, following a reset of the system 10. Each of the processors 12-16 then determines whether its timer (set at block 56) has expired (block 62). In the case where the processors 12-16 are Intel Itanium™ processors, expiration of a timer occurs when a calculated future count value is reached. Of course, timer expiration may occur in different manners depending on the particular hardware platform (e.g., processor type) used within the multiprocessor system 10. In any case, if any one of the processors 12-16 determines that its timer has expired, then it writes a worst case weighted value (which is not equal to the default value) to the shared resource 26 (block 64) and then initializes its loop counter to zero (block 66) for use by the second phase or routine depicted in FIG. 2b. Otherwise, processors having unexpired timers read the shared resource 26 again and determine whether the value returned by the shared resource 26 equals the default value (blocks 58 and 60). If the value stored in the shared resource 26 is not equal to the default value, then all processors having unexpired timers exit their wait loops and initialize their respective loop counters (block 66). While the example embodiment described herein writes a worst case weighted value to the shared resource (block 64), a processor at block 64 could instead write its own weighted value to the shared resource to carry out the system and method described herein with identical or similar results.

Thus, during execution of the first phase or routine shown in FIG. 2a, if a timer associated with any one of the processors 12-16 expires, that processor changes the value stored in the shared resource 26 from the default value to a worst case weighted value, thereby releasing all processors having unexpired timers from their respective wait loops (i.e., blocks 58-62). In this manner, the first phase or routine of the processor selection technique shown in FIGS. 2a-c enables all of the processors 12-16 to be substantially synchronized to begin execution of the second phase or routine shown in FIG. 2b at approximately the same time.

However, it should be recognized that the processors 12-16 are typically not perfectly synchronized at the completion of the first phase or routine shown in FIG. 1. Specifically, the timer associated with the processor that first establishes its timer (block 56) will expire first, thereby enabling that processor to proceed to execution of the second phase or routine prior to the other processors. Additionally, processors with unexpired timers will typically have to execute several additional instructions to determine that the value in the shared resource 26 has been changed by the processor with the first to expire timer.

FIG. 2b depicts an example of the second phase or routine that can be used by the processor selection technique of FIGS. 2a-c to enable the processor having the best weighted value to store that weighted value in the shared resource 26. Following execution of the first phase or routine shown in FIG. 2a, the processors 12-16 begin execution of the second phase or routine in a substantially synchronized manner (i.e., all of the processors 12-16 begin execution of the second phase or routine at approximately the same time). As shown in FIG. 2b, each of the processors 12-16 establishes a timer to measure a predetermined period of time that is greater than or equal to the longest (i.e., worst case) time period required by any one of the processors 12-16 (i.e., the slowest processor) to execute the computer code or firmware associated with the second phase or routine shown in FIG. 2b.

The processors 12-16 then read the shared resource 26 (block 70) and compare their weighted value to the value stored in the shared resource 26 (block 72). The weighted value used by each of the processors 12-16 in the example shown in FIG. 1 is a unique numerical identifier associated with the processor concatenated with a numerical value representative of the health or operating condition of the processor.

Figure 3:
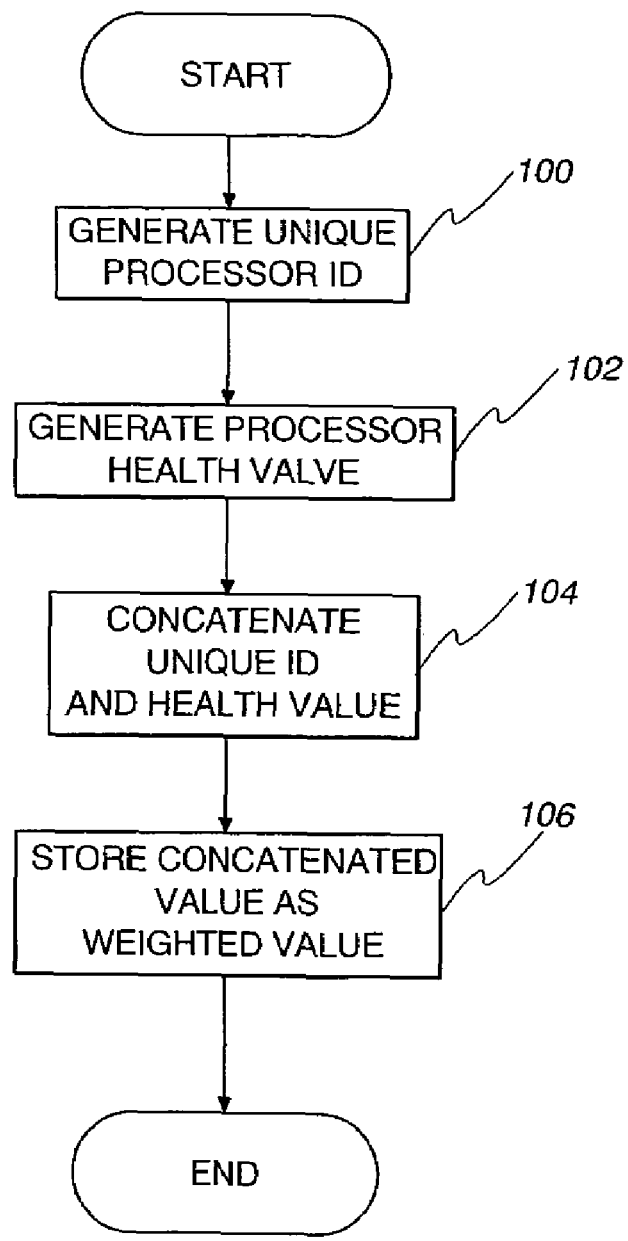
FIG. 3 is a flow diagram that depicts an example of one manner in which the processors shown in FIG. 1 may be programmed to generate their weighted values.

FIG. 3 depicts an example of one manner in which the processors 12-16 may be programmed to generate their respective weighted values. Using the example technique shown in FIG. 3, each of the processors 12-16 generates a unique numerical identifier (block 100). The unique identifier for each of the processors 12-16 is retrieved from a respective general purpose register or any other similar storage device or memory within the processors 12-16. For example, in the case where the processors 12-16 are Intel Itanium™ processors, the processor abstraction layer (PAL) within each of the processors 12-16 provides a unique identifier for its respective processor. For example, the processors 12-16 may have respective unique numerical identifiers 1, 2 and 3.

The processors 12-16 generate their respective health values (block 102) based on one or more attributes of the processors such as, for example, processor execution speed, processor case temperature, or any other desired parameter or attribute or combination of parameters and attributes. For example, the relative health of a processor may range from 1-9, where a larger numerical value corresponds to a better relative health.

Each of the processors 12-16 then concatenates its unique identifier with its health value (block 104) to form a weighted value for that processor. Thus, in the case where the unique identifiers range from 1 to 3 and the possible health values range from 1-9, the possible weighted values for the processors 12-16 range from 11 to 93, where the tens position of the weighted value represents the relative health of a processor and the ones position represents the unique processor identifier. Each of the processors 12-16 then stores its weighted value locally within a register or the like (block 106).

Referring again to FIG. 2b, if the weighted value for a processor (e.g., its health value concatenated with its unique identifier) is better (e.g., numerically greater) than the value currently stored in the shared resource 26, the processor attempts to write to the shared resource 26 (block 74). For the first iteration of the routine shown in FIG. 2b, the value stored in the shared resource 26 is equal to the worst case weighted value previously stored by the first routine or phase (block 64), which, in the above example, is "11." Of course, the worst case value will change depending on the range of possible health values and unique identifiers.

Because the processors 12-16 execute the second routine or phase shown in FIG. 2b at substantially the same time, an inherent race condition exists among processors that determine that they have a better weighted value than the value currently stored within the shared resource but which have not yet written their value to the shared resource. As a result, one or more of the processors 12-16 may attempt to write their weighted values to the shared resource 26 at about the same time but, ultimately, only one of the processors 12-16 will do so successfully. However, as described in more detail below, each successive iteration of the second phase or routine shown in FIG. 2b reduces the number of processors engaged in the race condition so that the processor having the best weighted value is ultimately guaranteed to write its value to the shared resource 26. As shown in FIG. 2b, processors that determine that their weighted value is not better than the value currently stored in the shared resource 26 do not attempt to write to the shared resource 26.

After either attempting to write their weighted value to the shared resource 26 or determining that no such attempt should be made, the processors 12-16 determine whether their timers have expired (block 76). If a processor determines that its timer has not expired it continues to check its timer (block 76) and, thus, waits in a loop. Because the processors 12-16 have all established or set their timers (block 68) with the same value to measure a time that is greater than or equal to the time required by the slowest one of the processors 12-16 to execute the activities represented by blocks 70, 72 and 74, all of the processors 12-16 will eventually be in their respective wait loops (block 76) at the same time. In other words, the fastest processor will simply remain in its wait loop longer than the other processors. However, all of the processor timers will expire at substantially the same time and because all of the processors are in their wait loops (block 76) when the timers expire, all of the processors will proceed to increment their loop counters at substantially the same time (block 78).

After incrementing their loop counters, the processors 12-16 determine whether their loop counters are less than or equal to the number of processors, which in the example shown in FIG. 1 is three. If the loop counters are less than or equal to three, the processors 12-16 re-establish their timers (block 68) and repeat the activities associated with blocks 68-80. On the other hand, if the loop counters are greater than three (i.e., are equal to four), the processors 12-16 perform the activities associated with the third phase or routine shown in FIG. 2c. As can be appreciated from the foregoing, the wait loop (block 76) within the second phase or routine ensures that the processors 12-16 execute the activities associated with the blocks 68-80 in a substantially synchronized manner. Further, it should be recognized that it may be difficult for the processors 12-16 to exchange information relating to the number of processors that are currently active (or present) within the system 10, particularly during early firmware stages when interprocessor communications are limited or impossible. Thus, in cases where it is not possible to know with certainty how many processors will be used within a multiprocessor system, the loop counters may be set to count a number of iterations equal to the maximum number of processors that can be supported by the particular hardware platform being used to carry out the processor selection technique described herein.

FIG. 2c depicts an example of a third phase or routine that can be used to enable the processor having the best weighted value to identify itself as the selected processor. As shown in FIG. 2c, each of the processors 12-16 reads the shared resource 26 (block 82) and determines whether the value stored in the shared resource 26 is equal to its weighted value (block 84). If a processor (e.g., the processor 16) determines that its weighted value is equal to the value stored in the shared resource 26, then that processor (e.g., the processor 16) recognizes that it has been selected to carry out activities such as, for example, a boot process for the system 10. On the other hand, if a processor (e.g., the processor 16) determines that its weighted value is not equal to the value stored in the shared resource 26, then that processor (e.g., the processor 16) recognizes that it has not been selected (block 88) and may, for example, enter an idle state.

While the example processor selection technique shown and described in connection with FIGS. 2a-2c results in the selection of a single processor, the technique can be modified to select a group of processors from a plurality of processors. By way of example, elimination of the unique identifier, which is used throughout the example shown in FIGS. 2a-2c, enables selection of a group of processors having the same health value. In particular, if the processors 12-16 shown in FIG. 1 have respective health values of 7, 7 and 2, such a selection technique would result in the selection of the processors 12 and 14 because they have the same highest health value.

Although certain methods and apparatus implemented in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A processor programmed to:
   write to a memory location a first weighted value corresponding to the processor to overwrite a second weighted value stored in the memory location and associated with another processor;
   compare the first weighted value of the processor with the second weighted value associated with the other processor; and
   select the processor if the first weighted value of the processor is better than the second weighted value.

2. The processor of claim 1 further programmed to select the processor if the first weighted value of the processor is numerically greater than the second weighted value.

3. The processor of claim 1 further programmed to generate the first weighted value associated with the processor using a parameter indicative of a relative health of the processor.

4. The processor of claim 1 further programmed to generate the first weighted value using a unique identifier associated with the processor.

5. A semiconductor circuit to be communicatively coupled to a processing unit, the semiconductor circuit to:
   write a first weighted value to a memory location based on information stored in the memory location at substantially the same time as another processing unit writes a second weighted value to the memory location;
   compare the first weighted value associated with the processing unit to the second weighted value associated with the other processing unit; and
   select the processing unit if the first weighted value is better than the second weighted value.

6. The semiconductor circuit of claim 5, wherein the first and second weighted values are associated with a respective health of each of the processing units.

7. The semiconductor circuit of claim 5 to generate the weighted value based on a performance condition of the processing unit.

8. The semiconductor circuit of claim 5 to overwrite the second weighted value in the memory location.

9. A processor programmed to:
   substantially synchronize with a plurality of other processors following a reset operation;
   contend for a memory location a plurality of times with each of the plurality of other processors; and
   read data in the memory location to determine whether the processor is a bootstrap processor.

10. The processor of claim 9, wherein the memory location is not multiprocessor safe.

11. The processor of claim 9, wherein reading the data in the memory location to determine whether the processor is a bootstrap processor includes reading a weighted value in the memory location.

12. The processor of claim 9, wherein the data is a weighted value associated with the processor.

13. The processor of claim 9 programmed to generate the weighted value based on a performance condition of the processor.

14. The processor of claim 9 programmed to contend for a memory location a plurality of times with each of the plurality of other processors by overwriting the memory location.

15. A semiconductor circuit to be communicatively coupled to a processing unit, the semiconductor circuit to:

write a first weighted value to a memory location based on a comparison of the first weighted value to a second weighted value stored in the memory location, wherein the second weighted value is associated with another processing unit; and select the processing unit based on the comparison.

16. The semiconductor circuit as defined in claim 15 to cause the processing unit to generate the first weighted value using a parameter indicative of the relative health of the processing unit.

17. The semiconductor circuit as defined in claim 15 to cause the processing unit to substantially synchronize the operations of the processing unit with the other processing unit prior to comparing the first and second weighted values.

18. The semiconductor circuit as defined in claim 17 to cause the processing unit to substantially synchronize the operations of the processing unit with the other processing unit by determining whether a timer associated with the processing unit has expired.

19. The semiconductor circuit as defined in claim 15 to cause the processing unit to select the processing unit based on the comparison by selecting the processing unit if the first weighted value is at least one of a best weighted value or a numerically greatest weighted value.

20. The semiconductor circuit as defined in claim 15 to cause the processing unit to generate the first weighted value using a unique identifier associated with the processing unit so that the first weighted value is different from the second weighted value.

21. The semiconductor circuit as defined in claim 15 to cause the processing unit to set a timer associated with the processing unit to determine a worst case execution time associated with the processing units.

22. The semiconductor circuit as defined in claim 21 to cause the processing unit to use the timer and a wait loop to substantially synchronize the processing units.

23. A system comprising:
at least two processors;
a non-volatile memory coupled to the at least two processors, the non-volatile memory to store instructions which, when executed, cause the processors to perform a method comprising:
each processor reading a weighted value from a shared resource;
each processor comparing the read weighted value to a weighted value associated with the processor,
if the read weighted value is worse than the weighted value associated with the processor, then the processor abstaining from writing a value to the shared resource, reading the weighted value from the shared resource, and comparing the read weighted value to its weighted value;
if the read weighted value is better than the weighted value associated with the processor, then the processor writing its weighted value to the shared resource,
if the read weighted value is the same as the weighted value, then selecting the processor with that value; and
repeating until a processor is selected.

24. The system of claim 23, wherein the method further comprises:
each processor initially writing its weighted value to the shared resource.

25. A method comprising:
each processor reading a weighted value from a shared resource;
each processor comparing the read weighted value to a weighted value associated with the processor,
if the read weighted value is worse than the weighted value associated with the processor, then the processor abstaining from writing a value to the shared resource, reading the weighted value from the shared resource, and comparing the read weighted value to its weighted value;
if the read weighted value is better than the weighted value associated with the processor, then the processor writing its weighted value to the shared resource,
if the read weighted value is the same as the weighted value, then selecting the processor with that value; and
repeating until a processor is selected.

26. The method of claim 25 further comprising:
each processor initially writing its weighted value to the shared resource.

* * * * *